Patented June 14, 1932

1,863,528

UNITED STATES PATENT OFFICE

LEROY C. STEWART, OF MIDLAND, MICHIGAN, ASSIGNOR TO THE DOW CHEMICAL COMPANY, OF MIDLAND, MICHIGAN, A CORPORATION OF MICHIGAN

MAGNESIA CEMENT COMPOSITION

No Drawing. Application filed August 4, 1930. Serial No. 473,128.

The present invention is concerned with plastic compositions of the type broadly described as magnesia cements, and more especially with such compositions wherein the principal active ingredients are plastic magnesia, magesium sulphate and water, together with smaller amounts of certain substances which impart added strength and other desirable properties thereto.

The addition of substances of the aforesaid type in small amounts to magnesium oxysulphate cements has been set forth in my patent application filed September 4, 1928, Serial No. 303,977. Substances found especially beneficial for the above purpose were soluble salts of copper or zinc, phosphates, arsenates, etc. of the alkali metals and ammonia, organic acids such as acetic, citric, tartaric, and the like, and soluble salts of such acids, as well as combinations of two or more of the above named substances. Of these beneficial substances used soluble citrate compounds such as citric acid and sodium citrate were found most effective, an increased strength of as much as three hundred per cent being obtained when a small amount of the latter was incorporated in a magnesium oxysulphate cement.

I have discovered that calcium citrate, which is a relatively insoluble salt, may be advantageously used in place of the soluble salts enumerated above under similar conditions and with equally satisfactory results.

To the accomplishment of the foregoing and related ends, the invention, then, consists of the features hereinafter fully described and particularly pointed out in the claims, the following description setting forth in detail one approved combination of ingredients embodying my invention, such disclosed means constituting, however, but one of various ways in which the principle of the invention may be used.

An example of the improvement in a magnesium oxysulphate cement secured by the use of a mixture containing calcium citrate is given in the following tabulation, in which the figures are given for the strength of the wet, dry and recovered samples as shown by the modulus of rupture expressed in pounds per square inch. For purposes of comparison the corresponding figures of a sample in which citric acid has been added are also included. The compositions were made up by combining a dry mixture consisting of 15 parts plastic magnesia, 8½ parts silex, 58½ parts sand, 1$\tfrac{7}{10}$ parts asbestos fiber and 16$\tfrac{3}{10}$ parts magnesium sulphate crystals $$(MgSO_4.7H_2O)$$

by weight. The substance in question was then mixed with the above constituents and subsequently stirred with water to a trowelling consistency. In the dry mixture the chief active ingredients are obviously plastic magnesia, which is a specially prepared grade of calcined magnesium oxide most suitable for cement mixtures, and magnesium sulphate. The other ingredients act merely as fillers.

Table 1

|  | Modulus of rupture—Lb./sq. in. | | |
| --- | --- | --- | --- |
|  | Wet | Dry | Recovered |
| No added substance | 242 | 1,135 | 489 |
| ½ per cent citric acid | 742 | 1,521 | 1,640 |
| 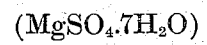 per cent calcium citrate | 771 | 1,494 | 1,543 |

In the table the specimens marked "wet" were immersed for twenty-four hours in water on the 14th, 16th, and 18th days after making. They were then tested on the 19th day. The "recovered" specimens were treated exactly in the same way except that they were not tested until the 21st day at which time they have been allowed to dry for two days. The "dry" specimens which were aged in air and out of contact with water, were tested on the 20th day, to afford a fair comparison as to aging between the test on the 19th and 21st days, respectively, of the other specimens. These tests were made in accordance with the standard procedure for testing magnesia cements.

The results obtained by the use of calcium citrate as a strength promoting or beneficial substance in an oxysulphate cement, it is noted, compare favorably with those obtained when a soluble salt, such as citric acid, which is representative of that type of compounds, is used. Calcium citrate, however, may be purchased at a fraction of the cost of the substances for which it may be substituted and may be obtained in quantities sufficient to make its use commercially feasible. The employment of calcium citrate, therefore, for the purpose in question is both advantageous and economical.

In the above example the figures given are to be considered as representative of mixtures made up by using a good average grade of plastic magnesia. By employing materials of varying quality, not only may lower or higher strengths be obtained, but the beneficial effects due to the calcium citrate incorporated therewith may vary considerably. The amounts of calcium citrate thus used may obviously be greater or less than the specific example given, e. g., as little as ¼ per cent or as much as 3 per cent thereof, based on the weight of magnesium sulphate

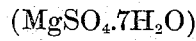
($MgSO_4.7H_2O$)

employed in the plastic mixture, having been used with beneficial results.

The amount of insoluble citrate necessary to produce a given result is practically the chemical equivalent of a soluble citrate or citric acid used, i. e. the proportion of the insoluble citrate content is to be such that its citric acid equivalent is approximately the same as the citric acid equivalent of the required amounts, respectively, of the previously employed soluble citrate salts. A method of introducing the insoluble citrate into the mix has been described, but other suitable ways of accomplishing the same will be evident to one skilled in the art of handling such materials.

In the aforementioned patent application I have disclosed and claimed a magnesium oxysulphate cement composition including as a substance of the type in question a small amount of a soluble citrate, e. g. sodium citrate. In the present application I desire to claim a magnesium oxysulphate cement composition which includes a relatively small amount of an insoluble citrate, e. g. calcium citrate, as a substance, the presence of which in said composition imparts added strength and is otherwise beneficial thereto. The invention is understood to comprehend not only the complete cement composition as a wet mix, but also a dry mixture of the essential primary ingredients magnesia, magnesium sulphate and calcium citrate with or without a filler, and, furthermore, a mixture of ingredients for incorporating in a magnesia cement, such mixture consisting of magnesium sulphate and a small amount of calcium citrate intimately mixed therewith.

Inasmuch as a uniformly beneficial action is obviously contingent upon the thorough distribution of the insoluble citrates throughout the mix, I prefer to use such citrate in a powdered, more preferably a finely powdered condition, which condition of subdivision permits the thorough dissemination required. It is to be noted also that a crude citrate may be used, it being unnecessary to refine the raw product if proper allowance be made for impurities present of a material amount.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A plastic cement composition which comprises as active ingredients magnesia, magnesium sulphate and water, together with a relatively small amount of a substantially insoluble citrate intimately incorporated therewith.

2. A plastic cement composition which comprises as active ingredients magnesia, magnesium sulphate and water, together with a relatively small amount of calcium citrate intimately incorporated therewith.

3. A plastic cement composition which comprises as active ingredients magnesia, magnesium sulphate and water together with from ¼ to 3 per cent of calcium citrate based upon the weight of magnesium sulphate ($MgSO_4.7H_2O$) intimately incorporated therewith.

4. A cement composition comprising the primary ingredients magnesia and magnesium sulphate, together with a relatively small amount of a substantially insoluble citrate and a filler, and adapted to set upon admixing with water.

5. A cement composition comprising the primary ingredients magnesia and magnesium sulphate, together with a relatively small amount of calcium citrate, and adapted to set upon admixing with water.

6. A cement composition comprising the primary ingredients magnesia and magnesium sulphate, together with a relatively small amount of calcium citrate and a filler, and adapted to set upon admixing with water.

7. An ingredient suitable for incorporating in a magnesia cement, said ingredient comprising magnesium sulphate and a relatively small amount of a substantially insoluble citrate.

8. An ingredient suitable for incorporating in a magnesia cement, said ingredient comprising magnesium sulphate and a relatively small amount of calcium citrate.

Signed by me this 30th day of July, 1930.

LEROY C. STEWART.